(12) United States Patent
Kim et al.

(10) Patent No.: US 9,652,403 B2
(45) Date of Patent: May 16, 2017

(54) MEMORY CONTROL UNIT AND DATA STORAGE DEVICE INCLUDING THE SAME

(71) Applicant: SK hynix Inc., Gyeonggi-do (KR)

(72) Inventors: Jae Woo Kim, Gyeonggi-do (KR); Kwang Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 383 days.

(21) Appl. No.: 14/483,990

(22) Filed: Sep. 11, 2014

(65) Prior Publication Data

US 2015/0309943 A1  Oct. 29, 2015

(30) Foreign Application Priority Data

Apr. 23, 2014  (KR) ........................ 10-2014-0048497

(51) Int. Cl.
| | | |
|---|---|---|
| *G06F 13/36* | (2006.01) | |
| *G06F 12/1081* | (2016.01) | |
| *G06F 13/16* | (2006.01) | |
| *G06F 13/28* | (2006.01) | |
| *G06F 9/44* | (2006.01) | |

(52) U.S. Cl.
CPC ........ *G06F 12/1081* (2013.01); *G06F 9/4411* (2013.01); *G06F 13/1673* (2013.01); *G06F 13/28* (2013.01); *G06F 2212/2532* (2013.01); *Y02B 60/1228* (2013.01)

(58) Field of Classification Search
CPC ............... G06F 12/1081; G06F 9/4411; G06F 13/1673; G06F 13/28
USPC ........................................................ 710/308
See application file for complete search history.

(56) References Cited

U.S. PATENT DOCUMENTS

| | | | | |
|---|---|---|---|---|
| 5,740,461 A | * | 4/1998 | Jaggar ................ | G06F 9/30174 712/209 |
| 5,894,560 A | * | 4/1999 | Carmichael ............ | G06F 13/28 710/20 |
| 6,115,771 A | * | 9/2000 | Born ..................... | G06F 13/385 370/466 |
| 6,145,016 A | * | 11/2000 | Lai ........................ | G06F 13/128 709/208 |
| 6,708,234 B2 | * | 3/2004 | Moteki .................. | G06F 13/28 358/444 |
| 6,799,232 B1 | * | 9/2004 | Wang .................... | G06F 12/04 341/50 |
| 7,024,549 B1 | * | 4/2006 | Luu ....................... | G06F 9/441 713/1 |
| 7,299,302 B2 | * | 11/2007 | Muro ..................... | G06F 13/28 710/22 |
| 8,001,285 B1 | * | 8/2011 | Bar-Shalom ........... | G06F 13/28 710/5 |
| 8,719,534 B1 | * | 5/2014 | Ray, III ................. | G06F 3/067 711/154 |
| 2002/0004897 A1 | * | 1/2002 | Kao .................... | G06F 9/30149 712/227 |
| 2004/0034718 A1 | * | 2/2004 | Goldenberg ........... | H04L 49/90 709/250 |

(Continued)

*Primary Examiner* — Paul R Myers
(74) *Attorney, Agent, or Firm* — IP & T Group LLP (57) ABSTRACT

A data storage device includes a storage memory device, a control unit suitable for generating a descriptor, which describes a work for controlling the storage memory device, and storing the descriptor in a working memory, and a memory control unit suitable for generating control signals for the storage memory device by fetching an instruction set from an instruction memory based on the descriptor.

20 Claims, 8 Drawing Sheets

(56) References Cited

U.S. PATENT DOCUMENTS

| | | | |
|---|---|---|---|
| 2006/0080479 A1* | 4/2006 | Anjo | G06F 13/28 710/22 |
| 2006/0161694 A1* | 7/2006 | Tomozaki | G06F 13/28 710/22 |
| 2006/0212612 A1* | 9/2006 | Takamiya | G06F 13/28 710/24 |
| 2006/0259656 A1* | 11/2006 | Sullivan | H04L 41/145 710/22 |
| 2008/0005386 A1* | 1/2008 | Matsuda | G06F 13/28 710/22 |
| 2009/0064095 A1* | 3/2009 | Wallach | G06F 8/447 717/106 |
| 2009/0296683 A1* | 12/2009 | Raju | H04L 69/324 370/349 |
| 2010/0198998 A1 | 8/2010 | Hiramoto et al. | |
| 2011/0225397 A1* | 9/2011 | Grisenthwaite | G06F 9/30174 712/208 |

\* cited by examiner

| | | |
|---|---|---|
| IST_ADD1 → | *231 | |
| IST_SET1 (Read) { | Additional Information 1 | 1 |
| | Additional Information 2 (CMD) | 2 |
| | Additional Information 3 (ADDR) | 3 |
| | Additional Information 6 | 6 |
| | Additional Information 5 (SIZE) | 5 |
| | Additional Information 7 | 7 |
| IST_ADD7 → | Additional Information 1 | 1 |
| IST_SET2 (Write) { | Additional Information 2 (CMD) | 2 |
| | Additional Information 3 (ADDR) | 3 |
| | Additional Information 4 (SIZE) | 4 |
| | Additional Information 6 | 6 |
| | Additional Information 8 | 8 |
| | Additional Information 7 | 7 |
| IST_ADD14 → | ⋮ | ⋮ |

FIG.5

Instruction Table

| Instruction | Additional Information | Operation Code (OPCODE) |
|---|---|---|
| Start | Additional Information 1 | 1 |
| Command Generation | Additional Information 2 | 2 |
| Address Generation | Additional Information 3 | 3 |
| Write Control Signal Generation | Additional Information 4 | 4 |
| Read Control Signal Generation | Additional Information 5 | 5 |
| Delay | Additional Information 6 | 6 |
| End | Additional Information 7 | 7 |
| State Checking | Additional Information 8 | 8 |
| ⋮ | | |

MEMORY CONTROL UNIT AND DATA STORAGE DEVICE INCLUDING THE SAME

CROSS-REFERENCES TO RELATED APPLICATION

The present application claims priority under 35 U.S.C. §119(a) to Korean application number 10-2014-0048497, filed on Aril 23, 2014, which is incorporated herein by reference in its entirety.

BACKGROUND

1. Technical Field

Various embodiments relate to a data storage device and, more particularly, to a memory control unit generating control signals to be provided to a memory device and a data storage device including the same.

2. Related Art

Recently, the paradigm for the computer environment has changed to ubiquitous computing so that computer systems can be used anytime and anywhere. Due to this fact, the use of portable electronic devices such as mobile phones, digital cameras, and notebook computers has rapidly increased. In general, such portable electronic devices use a data storage device that includes a memory device. The data storage device stores data used in the portable electronic devices.

A data storage device including a memory device provides advantages in that, since there are no moving parts, stability and durability are excellent, information access speed is high and power consumption is small. Data storage devices having such advantages include a universal serial bus (USB) memory device, memory cards having various interfaces, a universal flash storage (UFS) device, and a solid-state drive (SSD).

SUMMARY

A memory control unit capable of efficiently generating control signals to be provided to a memory device, and a data storage device including the same are described herein.

In an embodiment of the present invention, a data storage device may include: a storage memory device; a control unit suitable for generating a descriptor, which describes a work for controlling the storage memory device, and storing the descriptor in a working memory; and a memory control unit suitable for generating control signals for the storage memory device by fetching an instruction set from an instruction memory based on the descriptor.

In an embodiment of the present invention, a memory control unit may include: a descriptor fetch block suitable for reading a descriptor from a working memory; an instruction fetch block suitable for fetching an instruction set from an instruction memory based on the descriptor; and an instruction push block suitable for providing the instruction set and a descriptor parameter corresponding to the instruction set to a signal generation block in order to generate control signals for a storage memory device based on the instruction set and the descriptor parameter.

In an embodiment of the present invention, a memory control unit may include: a direct memory access (DMA) block suitable for reading a descriptor and data from a working memory; a descriptor queue suitable for storing a descriptor ID corresponding to the descriptor; a descriptor fetch part suitable for generating a descriptor address based on the descriptor ID for the DMA block to read the descriptor based on the descriptor address; an instruction fetch part suitable for fetching an instruction set from an instruction memory based on an address of the instruction memory, which is included in the descriptor; and an Instruction push part suitable for providing the instruction set and a parameter of the descriptor to a signal generation block, and requesting the DMA block to process data stored in the working memory or data to be stored in the control memory based on the address of the descriptor.

According to the embodiments of the present invention, control signals to be provided to a memory device may be efficiently generated and the operation speed of a data storage device may be increased.

DETAILED DESCRIPTION

Advantages, features and methods for achieving the present invention will become more apparent after reading about the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains may easily apply the technical concept of the present invention.

It is to be understood herein that embodiments of the present invention are not limited to the particulars shown in the drawings, the drawings are not necessarily to scale, and in some instances proportions may have been exaggerated to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element, or intervening elements may be present. As used herein, a singular form may include plural forms as well, and vice versa, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a memory control unit and a data storage device including the same will be described below with reference to the accompanying drawings through various examples of embodiments of the present invention.

Figure 1:
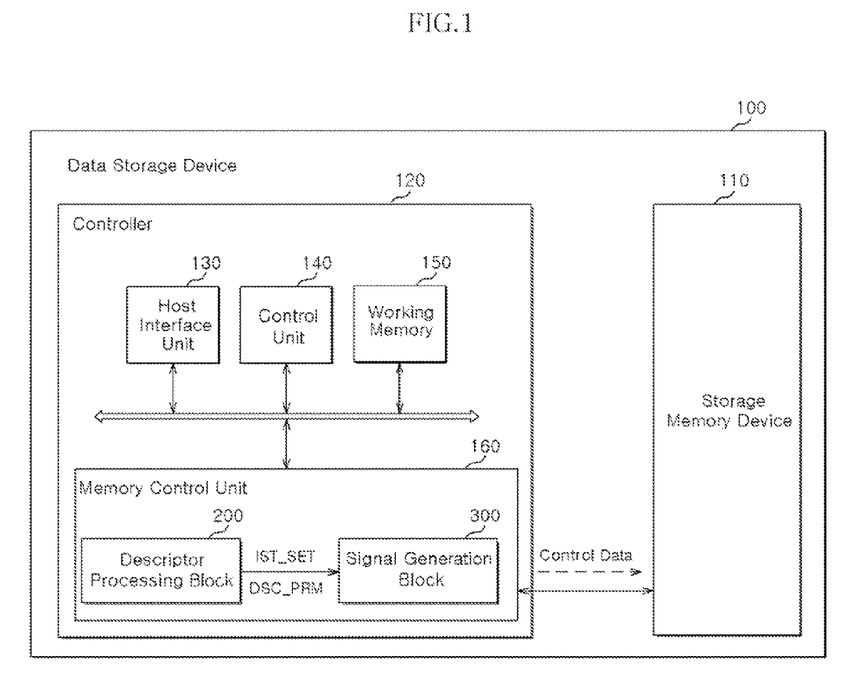
FIG. 1 is a block diagram exemplarily illustrating a data storage device in accordance with an embodiment of the present invention.

FIG. 1 is a block diagram exemplarily illustrating a data storage device in accordance with an embodiment of the present invention. A data storage device 100 may store data to be accessed by a host device (not shown) such as a mobile phone, an MP3 player, a laptop computer, a desktop computer, a game player, a TV, an in-vehicle infotainment system, and so forth. The data storage device 100 may also be referred to as a memory system.

The data storage device 100 may be manufactured as any one of various kinds of storage devices according to the protocol of an interface which is electrically coupled with the host device. For example, the data storage device 100 may be configured as a solid-state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so forth.

The data storage device 100 may be manufactured as any one of various kinds of package types. For example, the data storage device 100 may be manufactured as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a storage memory device 110 and a controller 120.

The storage memory device 110 may operate as the storage medium of the data storage device 100. For example, the storage memory device 110 may be any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The FRAM, the MRAM, the PCRAM and the RERAM are kinds of nonvolatile random access memory devices capable of random access to memory cells. The storage memory device 110 may be a combination of a NAND type flash memory device and one or more of the various types of nonvolatile random access memory devices described above.

The controller 120 may control the general operations of the data storage device 100 through driving of the firmware or the software loaded on a working memory 150 that is disposed in the controller 120. The controller 120 may decode or drive a code type instruction or algorithm, such as firmware or software. The controller 120 may be realized in hardware or in a combination of hardware and software.

The controller 120 may include a host interface unit 130, a control unit 140, the working memory 150, and a memory control unit 160. The memory control unit 160 may also be referred to as a memory interface unit. Although not shown, the memory control unit 160 may further include an error correction code (ECC) circuit that detects an error in the data read from the storage memory device 110, and corrects the detected error.

The host interface unit 130 may interface the host device and the data storage device 100 in correspondence with the protocol of the host device. For example, the host interface unit 130 may communicate with the host device through any one of a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The control unit 140 may analyze and process the request which is inputted from the host device. The control unit 140 may control the general operations of the controller 120 in response to the request of the host device. The control unit 140 may control the operations of the function blocks disposed in the controller 120, according to the firmware or software for driving the data storage device 100.

The working memory 150 may store the firmware or software to be driven by the control unit 140. Additionally, the working memory 150 may store data used to drive the firmware or the software. The working memory 150 may temporarily store data, which is identified with a data buffer memory address DT_ADD, to be transmitted from the host device to the storage memory device 110 or from the storage memory device 110 to the host device. That is, the working memory 150 may operate as a data buffer memory. Further, the working memory 150 may store a descriptor DSC corresponding to a descriptor address DSC_ADD.

The memory control unit 160 may control the storage memory device 110 according to the descriptor DSC generated by the control unit 140 and stored in the working memory 150. The descriptor may be a work order which describes work to be processed by the memory control unit 160 to control the storage memory device 110.

For example, the memory control unit 160 may generate and output the control signals to the storage memory device 110 according to the descriptor DSC. The control signals may include a command and an address for controlling the storage memory device 110. The memory control unit 160 may provide the data, which is buffered in the working memory 150, to the storage memory device 110 according to the descriptor DSC.

The descriptor processing block 200 may fetch the descriptor, from a descriptor buffer memory, for example, the descriptor storage region of the working memory 150. The descriptor processing block 200 may decode the fetched descriptor. The descriptor processing block 200 may fetch an instruction set IST_SET which may be recognized by the signal generation block 300, based on the decoded descriptor. The descriptor processing block 200 may control the signal generation block 300 to generate control signals for controlling the storage memory device 110 according to the instruction set IST_SET and the descriptor parameter DSC_PRM. These operations may be performed in parallel.

The signal generation block 300 may generate control signals to be provided to the storage memory device 110 based on the instruction set IST_SET and the descriptor parameter DSC_PRM, which are provided from the descriptor processing block 200. The signal generation block 300 may transfer the data DT from the descriptor processing block 200 to the storage memory device 110. Additionally, the signal generation block 300 may transfer the data and state information STTS from the storage memory device 110 to the descriptor processing block 200.

Figure 2:
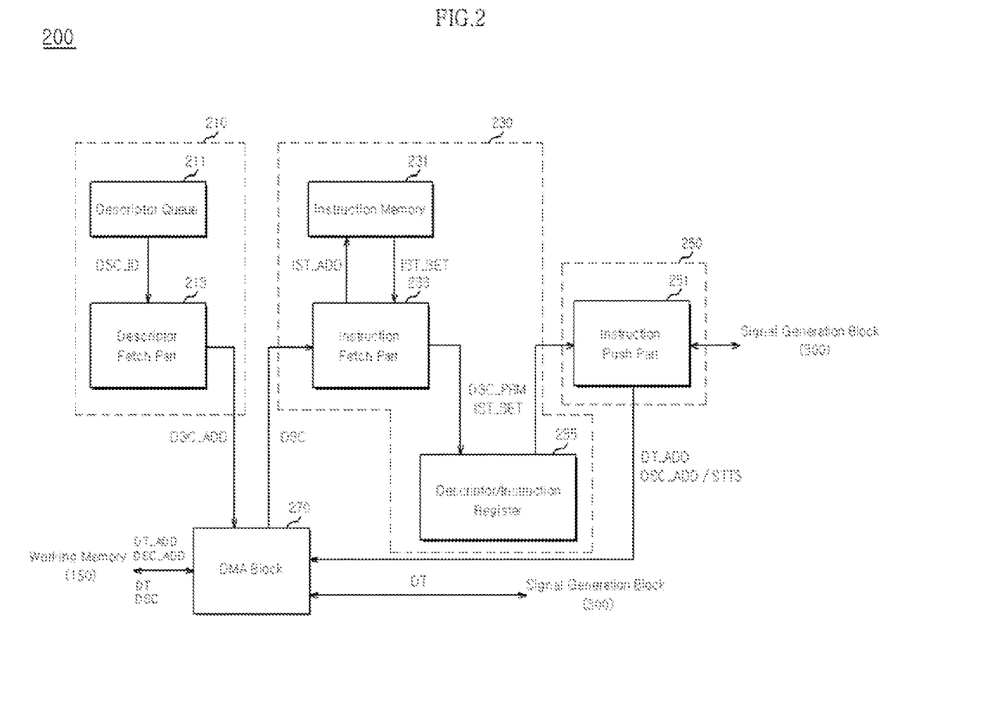
FIG. 2 is a block diagram exemplarily illustrating the descriptor processing block of a memory control unit in accordance with an embodiment of the present invention.
Figure 3:
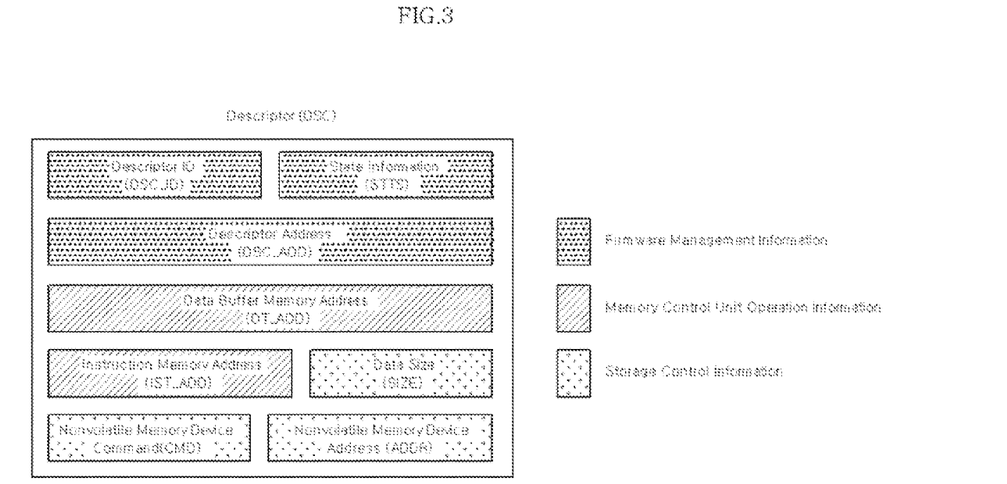
FIG. 3 illustrates a table describing a descriptor which is provided by a control unit to the memory control unit in accordance with an embodiment of the present invention.
Figure 4:
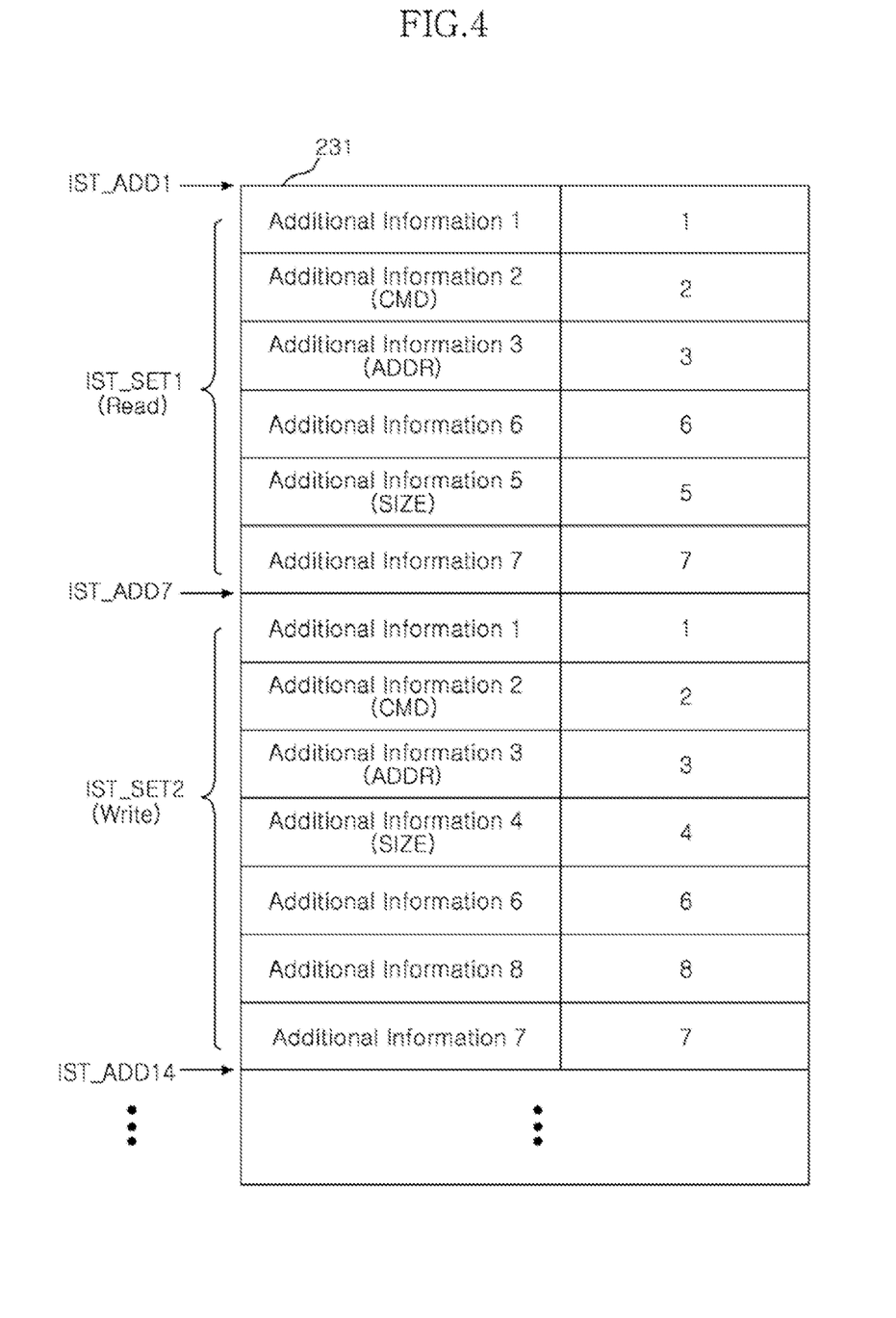
FIG. 4 illustrates a table describing the instruction sets stored in an Instruction memory in accordance with an embodiment of the present invention.

FIG. 2 is a block diagram exemplarily illustrating the descriptor processing block 200 of the memory control unit 160 in accordance with the embodiment of the present invention. FIG. 3 illustrates a table describing a descriptor which is provided by the control unit 140 to the memory control unit 160 in accordance with an embodiment of the present invention. FIG. 4 illustrates a table describing the instruction sets stored in an instruction memory in accordance with an embodiment of the present invention. In describing FIG. 2, reference will be made to the descriptor table shown in FIG. 3 and the instruction sets shown in FIG. 4.

The control unit 140 may generate the descriptor DSC and may store the generated descriptor DSC in a descriptor buffer memory, that is, a descriptor storage region of the working memory 150. The control unit 140 may assign an ID to each generated descriptor DSC. A descriptor ID DSC_ID may correspond to one descriptor storage region in the working memory 150. That is, a descriptor ID DSC_ID may include the address, hereinafter, referred to as the "descriptor address" of the descriptor storage region of the working memory 150.

Referring to FIG. 2, the descriptor processing block 200 may include a descriptor portion comprising a descriptor fetch block 210 and a direct memory access (DMA) block 270, and an instruction portion comprising an instruction fetch block 230 and an instruction push block 250.

The descriptor portion may obtain the descriptor DSC from the working memory 150 based on the descriptor ID DSC_ID or the descriptor address DSC_ADD provided from the control unit 140. The descriptor portion may provide the obtained descriptor DSC to the instruction portion. The instruction portion may extract the descriptor parameter DSC_PRM from the received descriptor DSC. The Instruction portion may fetch the instruction set IST_SET, which is stored an instruction memory, based on the received descriptor DSC. The instruction portion may output the fetched instruction set IST_SET with the extracted descriptor parameter DSC_PRM to the signal generation block 300. The descriptor parameter DSC_PRM may further include the data buffer memory address DT_ADD corresponding to the data DT temporarily stored in the working memory 150. The instruction portion may output the data buffer memory address DT_ADD to the descriptor portion. The descriptor portion may obtain the temporarily stored data DT from the working memory 150 in response to the data buffer memory address DT_ADD, and output the obtained data DT to the signal generation block 300.

An operation of reading the descriptor DSC generated by the control unit 140 described with reference to FIG. 1 may be performed by the DMA block 270 and the descriptor fetch block 210 which includes a descriptor queue 211 and a descriptor fetch part.

The descriptor fetch block 210 may receive the descriptor ID from the control unit 140. The descriptor fetch block 210 may request the DMA block 270 to read the descriptor DSC corresponding to the received descriptor ID DSC_ID. To this end, the descriptor fetch block 210 may provide the descriptor address DSC_ADD to the DMA block 270.

The descriptor queue 211 may store descriptor IDs DSC_ID. The descriptor IDs DSC_ID may be stored in the descriptor queue 211 according to the order in which the descriptor IDs DSC_ID are generated by the control unit 140.

The descriptor fetch part 213 may fetch any one of the descriptor IDs DSC_ID which are stored in the descriptor queue 211. For example, since the descriptor IDs DSC_ID are stored in the descriptor queue 211 according to the order in which they are generated, the descriptor fetch part 213 may fetch the descriptor ID DSC_ID which is stored first among the descriptor IDs DSC_ID stored in the descriptor queue 211.

As described above, the descriptor ID DSC_ID may indicate the descriptor storage region of the working memory 150. Accordingly, the descriptor fetch part 213 may calculate the descriptor address DSC_ADD of the working memory 150 based on the fetched descriptor ID DSC_ID.

The descriptor fetch part 213 may request the DMA block 270 to read the descriptor DSC corresponding to the fetched descriptor ID DSC_ID. The descriptor fetch part 213 may provide the calculated descriptor address DSC_ADD, which corresponds to the fetched descriptor ID DSC_ID, to the DMA block 270.

The DMA block 270 may read the descriptor DSC which is stored in the working memory 150, based on the descriptor address DSC_ADD provided from the descriptor fetch part 213. The DMA block 270 may provide the read descriptor DSC to an instruction fetch part 233 included in the instruction fetch block 230.

Operations of decoding the read descriptor DSC and fetching instructions based on the decoded descriptor DSC may be performed by the instruction fetch block 230 which includes an instruction memory 231, the instruction fetch part 233, and a descriptor/instruction register 235.

As shown in FIG. 4, an instruction memory address IST_ADD may indicate a start address of the instruction set IST_SET stored in the instruction memory 231. The instruction fetch part 233 may fetch the instruction set IST_SET based on the instruction memory address IST_ADD included in the read descriptor DSC. The instruction fetch part 233 may store the fetched instruction set IST_SET in the descriptor/instruction register 235.

The instruction fetch part 233 may store the descriptor parameter DSC_PRM extracted from the read descriptor DSC in the descriptor/instruction register 235 in which the corresponding instruction set IST_SET is stored.

For example, the descriptor parameter DSC_PRM may include the data buffer memory address DT_ADD. The data buffer memory address DT_ADD may indicate an address of the data DT stored in the working memory 150. The data DT may be transferred to or from the storage memory device 110.

For example, the descriptor parameter DSC_PRM may include a command CMD, an address ADDR, and information of data size SIZE, which are to be provided to the storage memory device 110. For example, the information of data size may indicate a size of data to be stored in or to be read from the storage memory device 110.

Operations of instructing generation of control signals to be provided to the storage memory device 110 based on the instruction set IST_SET and the corresponding descriptor parameter DSC_PRM, processing the data DT to be provided to the storage memory device 110 or read from the storage memory device 110 through the DMA block 270, and receiving an operation result according to the control signals, may be performed by the instruction push block 250 which includes an instruction push part 251.

The instruction push part 251 may provide the instruction set IST_SET and the corresponding descriptor parameter DSC_PRM, which are stored in the descriptor/instruction register 235, to the signal generation block 300, such that the control signals to be provided to the storage memory device 110 are generated.

The instruction push part 251 may request the DMA block 270 to provide the data DT, which is buffered in the working memory 150, to the signal generation block 300. Further, the instruction push part 251 may request the DMA block 270 to provide the read data provided through the signal generation block 300 from the storage memory device 110 to the working memory 150. The instruction push part 251 may provide the data buffer memory address DT_ADD included in the descriptor parameter DSC_PRM to the DMA block 270.

The DMA block 270 may access the working memory 150 based on the data buffer memory address DT_ADD. That is, the DMA block 270 may provide the data DT corresponding to the data buffer memory address DT_ADD to the signal generation block 300, or may store data DT read from the storage memory device 110 in the working memory 150 based on the data buffer memory address DT_ADD.

The instruction push block 250 may receive a result of the operation of the storage memory device 110, which is performed according to the control signals, such as the state information STTS of the storage memory device 110. The state information STTS may indicate whether the operation of the storage memory device 110 is being performed or whether the operation is a pass or a fall when the operation is completed. The instruction push block 250 may provide the descriptor address DSC_ADD and the state information STTS to the DMA block 270 such that the state information STTS is recorded in the descriptor DSC, which is stored in the working memory 150.

Referring to FIG. 3, the descriptor DSC may be generated by the control unit 140, and may be decoded and executed by the memory control unit 160. Therefore, the descriptor DSC may include information ("Firmware Management Information") to be managed by the control unit 140 or the firmware driven by the control unit 140, information ("Memory Control Unit Operation Information") used for the operation of the memory control unit 160, and information ("Storage Memory Device Control Information") for the memory control unit 160 to control the storage memory device 110.

The information ("Firmware Management Information") to be managed by the control unit 140 may include information on a descriptor ID DSC_ID which is assigned when the descriptor DSC is generated. The information ("Firmware Management Information") to be managed by the control unit 140 may include state information STTS which is reported to the control unit 140 as a processing result of the descriptor DSC or which is referred to by the control unit 140. The information ("Firmware Management Information") to be managed by the control unit 140 may include information on the descriptor address DSC_ADD of the working memory 150 at which the descriptor DSC is stored, that is, information on an address of the descriptor DSC stored in the working memory 150.

The information ("Memory Control Unit Operation Information") used for the operation of the memory control unit 160 may include information on the data buffer memory address DT_ADD of the working memory 150 in which data DT to be stored in the storage memory device 110 under the control of the memory control unit 160 is stored, that is, information on an address of data DT stored in the working memory 150. The information ("Memory Control Unit Operation Information") used for the operation of the memory control unit 160 may include information on the instruction memory address IST_ADD of the instruction memory 231 which should be read to fetch the instruction set IST_SET.

The information ("Storage Memory Device Control Information") for the memory control unit 160 to control the storage memory device 110 may include information on the command CMD to be provided to the storage memory device 110. The information ("Storage Memory Device Control Information") for the memory control unit 160 to control the storage memory device 110 may include information on an address ADDR to be provided to the storage memory device 110. The information ("Storage Memory Device Control Information") for the memory control unit 160 to control the storage memory device 110 may include information on data size SIZE which indicates the size of data to be stored in or to be read from the storage memory device 110.

Figure 5:
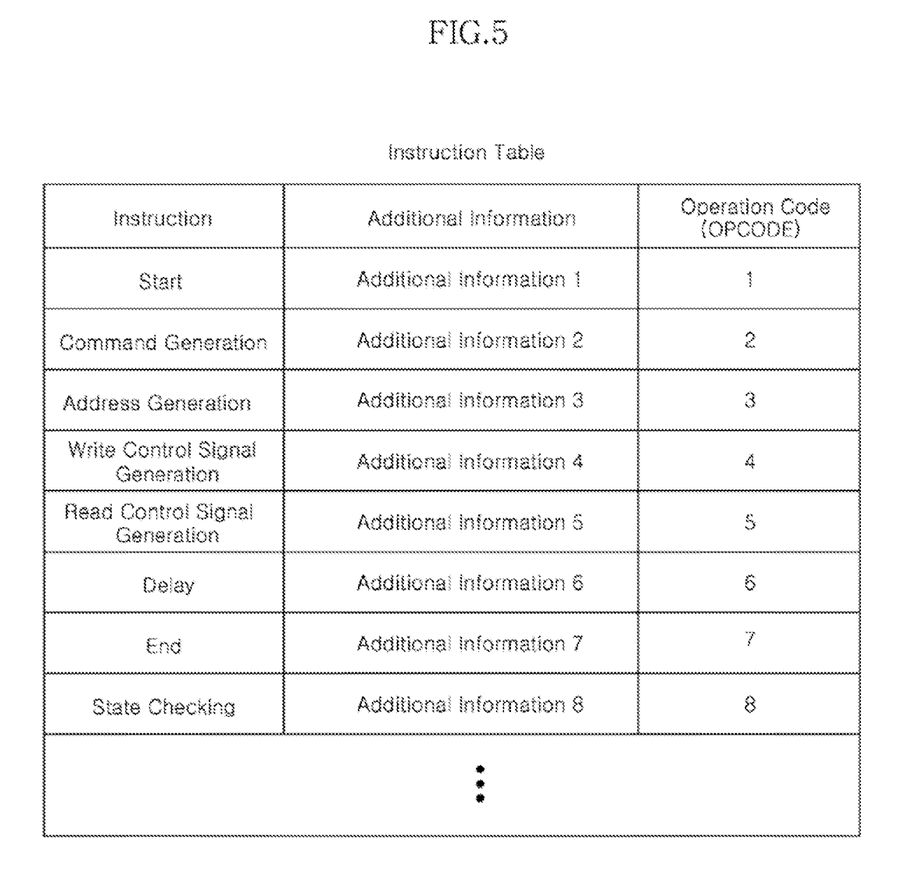
FIG. 5 illustrates a table describing instructions constituting instruction sets in accordance with an embodiment of the present invention.

FIG. 4 illustrates a table describing the instruction sets stored in the instruction memory 231 in accordance with an embodiment of the present invention. FIG. 5 illustrates a table describing with instruction sets in accordance with an embodiment of the present invention.

In a boot-up operation of the data storage device 100, various kinds of instruction sets such as IST_SET1 and IST_SET2 may be loaded on the instruction memory 231. Each instruction set IST_SET may indicate a control procedure for controlling the storage memory device 110. That is, the plurality of instruction sets IST_SET may be listed in order of the control procedure of the storage memory device 110.

Each instruction set IST_SET may be constituted by a combination of various instructions which are defined by the instruction table shown in FIG. 5. Each instruction may indicate the generation of a control signal to be provided to the storage memory device 110. Each instruction may be represented as an operation code OPCODE identifiable by the signal generation block 300 and additional information used for executing the operation code OPCODE. Various instruction sets IST_SET may be generated for control of various types of the storage memory device 110 by combining instructions in the instruction table.

For example, a read instruction set IST_SET1 provided to the signal generation block 300 from the descriptor processing block 200 to control the read operation of the storage memory device 110 will be described below with reference to FIGS. 4 and 5. The read instruction set IST_SET1 may be constituted sequentially by a start instruction, that is, operation code 1, a command generation instruction, that is, operation code 2, an address generation instruction, that is, operation code 3, a delay instruction, that is, operation code 6, a read control signal generation instruction, that is, operation code 5, and an end instruction, that is, operation code 7.

The start instruction (operation code 1) may instruct the start of an instruction set IST_SET. The command generation instruction (operation code 2) may indicate the generation of a control signal for providing a read command. Information on a command CMD included in a descriptor DSC may be added to the command generation instruction (operation code 2) as the descriptor parameter DSC_PRM. The address generation instruction (operation code 3) may indicate the generation of a control signal for providing an address to read data. Information on an address ADDR included in the descriptor DSC may be added to the address generation instruction (operation code 3) as the descriptor parameter DSC_PRM.

The delay instruction (operation code 6) may indicate the delay of the generation of a control signal. For example, when controlling the read operation of the storage memory device 110, the delay of the generation of a control signal may be required for a time of sensing the data of memory cells through a read circuit. In this case, the delay instruction (operation code 6) may be generated. The read control signal generation instruction (operation code 5) may indicate the generation of a control signal for controlling the data sensed from memory cells to be outputted to an exterior of the storage memory device 110. Information on data size SIZE included in the descriptor DSC may be added to the read control signal generation instruction (operation code 5) as the descriptor parameter DSC_PRM. The end instruction (operation code 7) may indicate the end of the instruction set IST_SET.

A write instruction set IST_SET2 provided to the signal generation block 300 from the descriptor processing block 200 to control the write operations of the storage memory device 110 will be described below with reference to FIGS. 4 and 5. The write instruction set IST_SET2 may include, sequentially, a start instruction (operation code 1), a command generation instruction (operation code 2), an address generation instruction (operation code 3), a write control signal generation instruction (operation code 4), a delay instruction (operation code 6), a state checking instruction (operation code 8), and an end instruction (operation code 7).

The start instruction (operation code 1) may indicate the start of an Instruction set IST_SET. The command generation instruction (operation code 2) may indicate the generation of a control signal for providing a write command. Information on a command CMD included in a descriptor DSC may be added to the command generation instruction (operation code 2) as the descriptor parameter DSC_PRM. The address generation instruction (the operation code 3) may indicate the generation of a control signal for providing an address to store data. Information on an address ADDR included in the descriptor DSC may be added to the address generation instruction (operation code 3) as the descriptor parameter DSC_PRM. The write control signal generation instruction (operation code 4) may indicate the generation of a control signal for providing data to the storage memory device 110.

The delay instruction (operation code 6) may indicate the delay of the generation of a control signal. For example, when controlling the write operation of the storage memory device 110, the delay of the generation of a control signal may be required for a time of storing data in memory cells through a write circuit. In this case, the delay instruction (operation code 6) may be generated. The state checking instruction (operation code 8) may indicate the generation of a control signal for checking the state information of the storage memory device 110 for the write operation. The end instruction (operation code 7) may indicate the end of the instruction set IST_SET.

As a consequence, by forming the instruction set IST_SET through combination of the instructions defined in the instruction table and adding additional information used for the execution of the instruction set as the descriptor parameter DSC_PRM, it is possible to generate control signals to control the operation of the storage memory device 110 according to the control procedure of the storage memory device 110.

Figure 6:
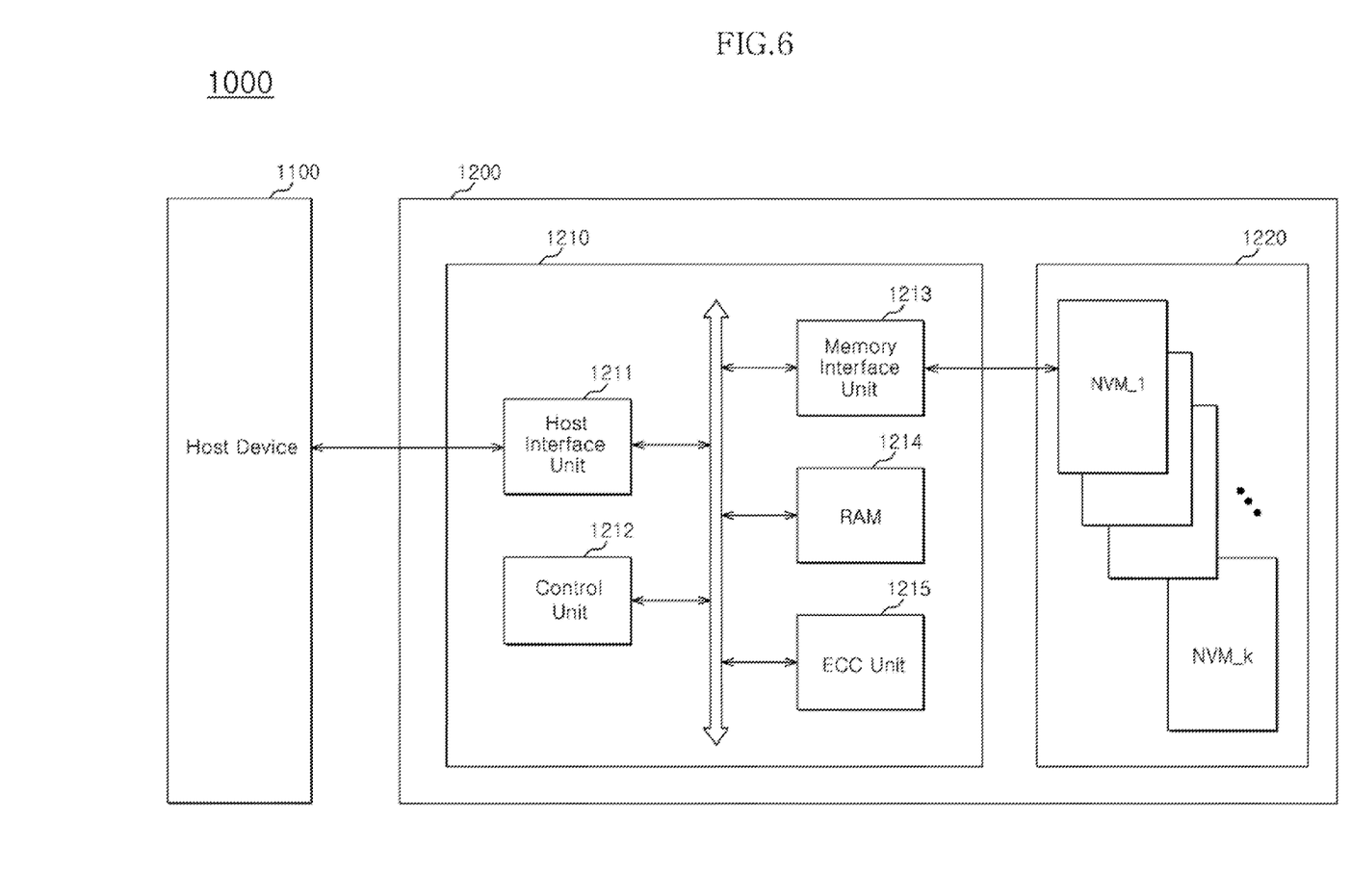
FIG. 6 is a block diagram exemplarily illustrating a data processing system in accordance with an embodiment of the present invention.

FIG. 6 is a block diagram exemplarily illustrating a data processing system in accordance with an embodiment of the present invention. Referring to FIG. 6, a data processing system 1000 may include a host device 1100 and a data storage device 1200.

The data storage device 1200 may include a controller 1210 and a storage memory device 1220. The data storage device 1200 may be used by being electrically coupled to the host device 1100, such as a mobile phone, an MP3 player, a laptop computer, a desktop computer, a game player, a TV, an in-vehicle infotainment system, and so forth. The data storage device 1200 is also referred to as a memory system.

The controller 1210 may access the storage memory device 1220 in response to a request from the host device 1100. For example, the controller 1210 may control the read, program or erase operations of the storage memory device 1220. The controller 1210 may drive firmware for controlling the storage memory device 1220.

The controller 1210 may include a host interface unit 1211, a control unit 1212, a memory interface unit 1213, a RAM 1214, and an error correction code (ECC) unit 1215.

The control unit 1212 may control the general operations of the controller 1210 in response to a request from the host device 1100. The RAM 1214 may be used as the working memory of the control unit 1212. The RAM 1214 may be used as a buffer memory which temporarily stores the data read from the storage memory device 1220 or the data provided from the host device 1100.

The host interface unit 1211 may interface the host device 1100 and the controller 1210. For example, the host interface unit 1211 may communicate with the host device 1100 through one of various interface protocols such as a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial ATA (SATA) protocol, a small computer system interface (SCSI) protocol, and a serial attached SCSI (SAS) protocol.

The memory interface unit 1213 may interface the controller 1210 and the storage memory device 1220. The memory interface unit 1213 may provide commands and addresses to the storage memory device 1220. Furthermore, the memory interface unit 1213 may exchange data with the storage memory device 1220.

As described above with reference to FIGS. 1 to 5, the memory interface unit 1213 may generate control signals to the storage memory device 1220 in such a manner that an instruction set is constituted by combining the instructions defined in an instruction table and additional information used to execute the instruction set that is added based on a descriptor parameter.

The error correction code unit 1215 may detect an error of the data read from the storage memory device 1220. Additionally, the error correction code unit 1215 may correct the detected error when the detected error is within a correctable range. The error correction code unit 1215 may be disposed inside or outside the controller 1210 according to the memory system 1000.

The storage memory device 1220 may be used as the storage medium of the data storage device 1200. The storage memory device 1220 may include a plurality of nonvolatile memory chips or dies, NVM_1 to NVM_k.

The controller 1210 and the storage memory device 1220 may be manufactured as any one of various data storage devices. For example, the controller 1210 and the storage memory device 1220 may be integrated into one semiconductor device and may be manufactured as any one of a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card, a compact flash (CF) card, a smart media card, a memory stick, and so forth.

Figure 7:
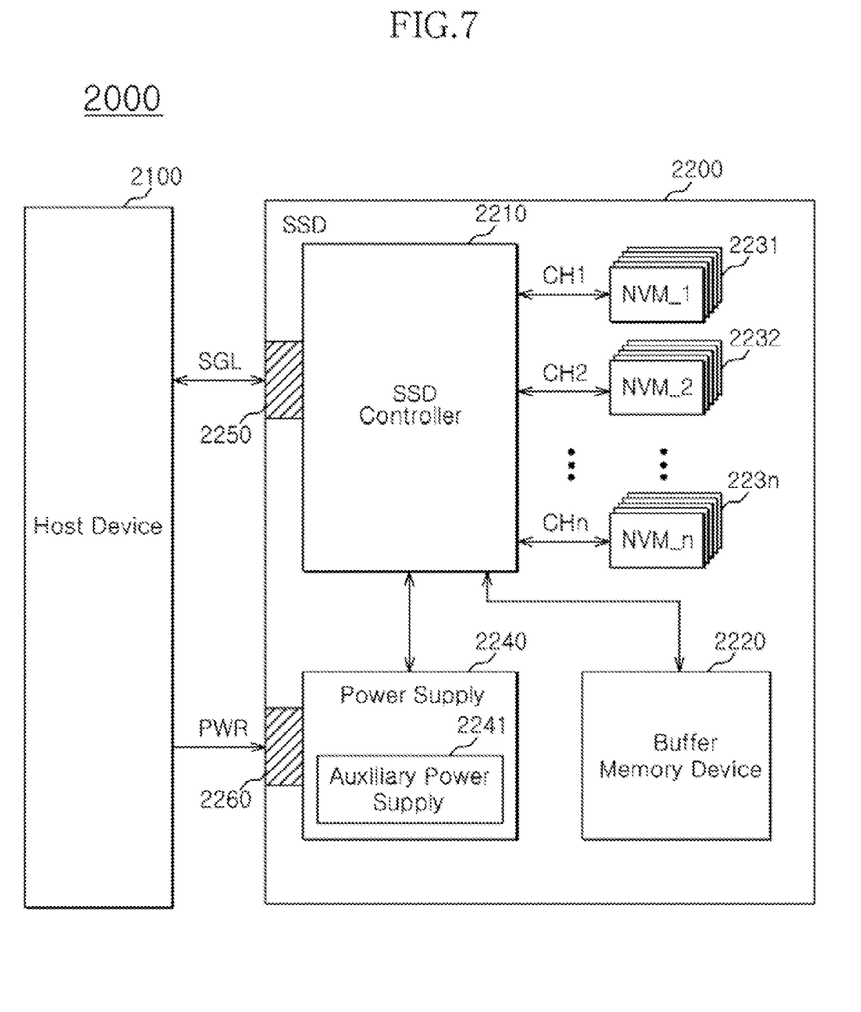
FIG. 7 is a block diagram exemplarily illustrating a data processing system including a solid-state drive (SSD) in accordance with an embodiment of the present invention.

FIG. 7 is a block diagram exemplarily illustrating a data processing system including a solid-state drive (SSD) in accordance with an embodiment of the present invention. Referring to FIG. 7, a data processing system 2000 may include a host device 2100 and a solid-state drive (SSD) 2200.

The SSD 2200 may include an SSD controller 2210, the buffer memory device 2220, storage memory devices 2231 to 223n, a power supply 2240, a signal connector 2250, and a power connector 2260.

The SSD 2200 may operate in response to a request from the host device 2100. That is, the SSD controller 2210 may access the storage memory devices 2231 to 223n in response to a request from the host device 2100. For example, the SSD controller 2210 may control the read, program and erase operations of the storage memory devices 2231 to 223n.

The buffer memory device 2220 may temporarily store data which is to be stored in the storage memory devices 2231 to 223n. Further, the buffer memory device 2220 may temporarily store data which is read from the storage memory devices 2231 to 223n. The data temporarily stored in the buffer memory device 2220 may be transmitted to the host device 2100 or the storage memory devices 2231 to 223n under the control of the SSD controller 2210.

The storage memory devices 2231 to 223n may be used as storage media of the SSD 2200. The storage memory devices 2231 to 223n may be electrically coupled to the SSD controller 2210 through a plurality of channels CH1 to CHn, respectively. One or more storage memory devices may be electrically coupled to one channel. The storage memory devices electrically coupled to one channel may be electrically coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may be constituted by a connector, such as a parallel advanced technology attachment (PATA), serial advanced technology attachment (SATA), small computer system interface (SCSI), serial attached SCSI (SAS), peripheral component interconnection (PCI) and PCI express (PCI-E) protocols, according to the interface scheme between the host device 2100 and the SSD 2200.

Figure 8:
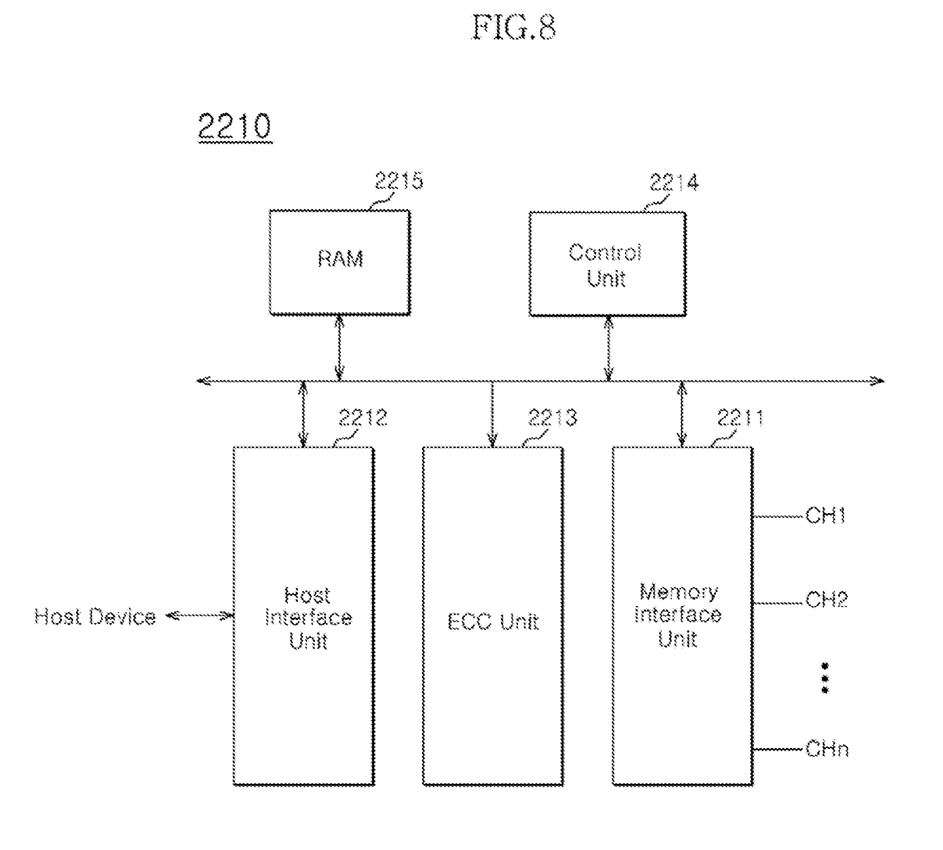
FIG. 8 is a block diagram exemplarily illustrating the SSD controller shown in FIG. 7.

FIG. 8 is a block diagram exemplarily illustrating the SSD controller shown in FIG. 7. Referring to FIG. 8, the SSD controller 2210 may include a memory interface unit 2211, a host interface unit 2212, an error correction code (ECC) unit 2213, a control unit 2214, and a RAM 2215.

The memory interface unit 2211 may provide a control signal such as a command and an address to the storage memory devices 2231 to 223n shown in FIG. 7. Moreover, the memory interface unit 2211 may exchange data with the storage memory devices 2231 to 223n. The memory interface unit 2211 may scatter the data transmitted from the buffer memory device 2220 shown in FIG. 7, to the respective channels CH1 to CHn, under the control of the control unit 2214. Furthermore, the memory interface unit 2211 may transmit the data read from the storage memory devices 2231 to 223n to the buffer memory device 2220, under the control of the control unit 2214.

As described above with reference to FIGS. 1 to 5, the memory interface unit 2211 may generate control signals to be provided to the storage memory devices 2231 to 223n, in such a manner that an instruction set is constituted by combining the instructions, which are defined in an instruction table, and additional information used to execute the instruction set is added based on a descriptor parameter.

The host interface unit 2212 may provide an interface with the SSD 2200 in correspondence to the protocol of the host device 2100. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI) and PCI express (PCI-E) protocols. Additionally, the host interface unit 2212 may perform a disk emulating function of supporting the host device 2100 to recognize the SSD 2200 as a hard disk drive (HDD).

The ECC unit 2213 may generate parity bits based on the data transmitted to the storage memory devices 2231 to 223n. The generated parity bits may be stored in spare areas of the storage memory devices 2231 to 223n. The ECC unit 2213 may detect an error of the data read from the storage memory devices 2231 to 223n. When the detected error is within a correctable range, the ECC unit 2213 may correct the detected error.

The control unit 2214 may analyze and process the signal SGL inputted from the host device 2100. The control unit 2214 may control the general operations of the SSD controller 2210 in response to a request from the host device 2100. The control unit 2214 may control the operations of the buffer memory device 2220 and the storage memory devices 2231 to 223n according to firmware for driving the SSD 2200. The RAM 2215 may be used as a working memory for driving the firmware.

Figure 9:
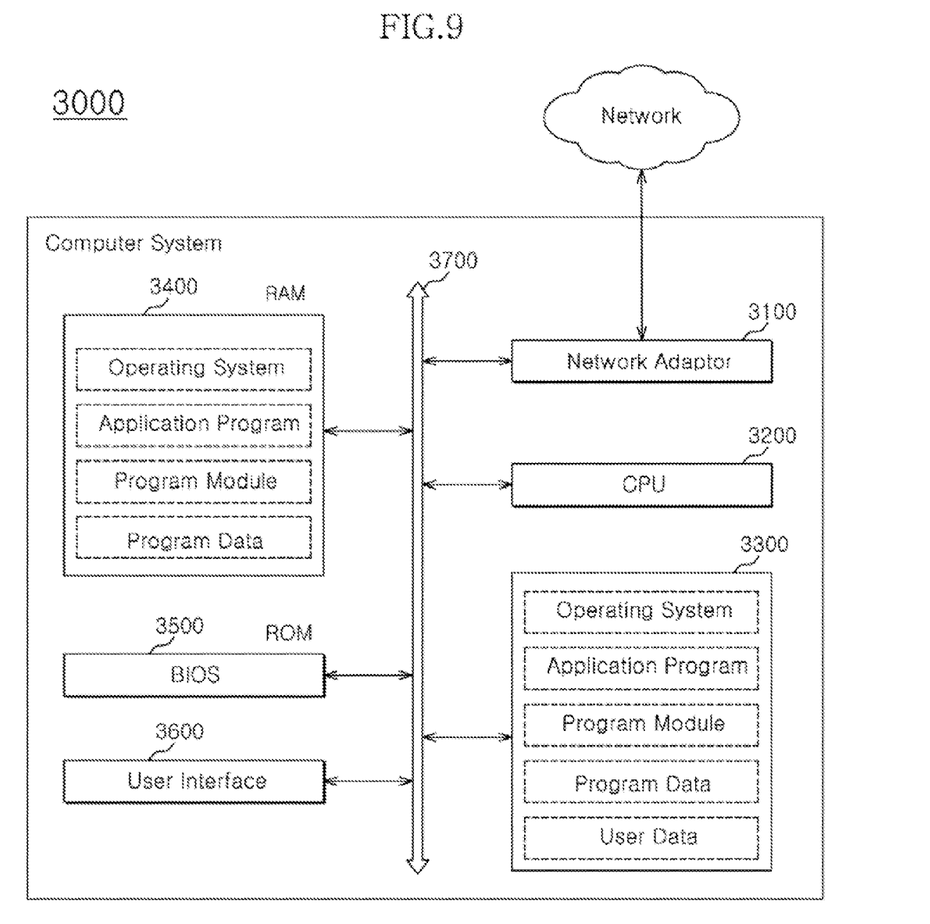
FIG. 9 is a block diagram exemplarily illustrating a computer system in which the data storage device in accordance with an embodiment of the present invention is mounted.

FIG. 9 is a block diagram exemplarily illustrating a computer system in which the data storage device in accordance with the embodiment of the present invention is mounted. Referring to FIG. 9, a computer system 3000 includes a network adaptor 3100, a central processing unit 3200, a data storage device 3300, a RAM 3400, a ROM 3500 and a user interface 3600, which are electrically coupled to a system bus 3700. The data storage device 3300 may be constituted by the data storage device 100 shown in FIG. 1, the data storage device 1200 shown in FIG. 6 or the SSD 2200 shown in FIG. 7.

The network adaptor 3100 provides interfacing between the computer system 3000 and external networks. The central processing unit 3200 performs general operations for driving an operating system residing at the RAM 3400 or an application program.

The data storage device 3300 stores general data used in the computer system 3000. For example, an operating system for driving the computer system 3000, an application program, various program modules, program data and user data are stored in the data storage device 3300.

The RAM 3400 may be used as a working memory device of the computer system 3000. Upon booting, the operating system, the application program, the various program modules and the program data for driving programs, which are read from the data storage device 3300, are loaded on the RAM 3400. A BIOS, that is, basic input/output system, which is activated before the operating system is driven, is stored in the ROM 3500. Information exchange between the computer system 3000 and a user is implemented through the user interface 3600.

Although not shown in the drawings, the computer system 3000 may further include devices such as an application chipset, a camera image processor, and so forth.

While certain embodiments have been described above, it will be understood to those skilled in the art that the embodiments described are examples only. Accordingly, the memory control unit and the data storage device including the same described herein should not be limited based on the described embodiments. Rather, the memory control unit and the data storage device including the same described herein should only be limited in light of the claims that follow when taken in conjunction with the above description and accompanying drawings.

What is claimed is:

1. A data storage device comprising:
   a nonvolatile memory device;
   a control unit suitable for generating a descriptor and storing the descriptor in a working memory, wherein the descriptor describes a work for controlling the nonvolatile memory device and includes an address of an instruction set stored in an instruction memory; and
   a memory control unit suitable for reading the descriptor from the working memory, fetching the instruction set from the instruction memory based on the address of the instruction set included in the descriptor, adding a descriptor parameter extracted from the descriptor to the fetched instruction set, generating control signals based on the fetched instruction set in which the descriptor parameter is added, and providing the control signals to the nonvolatile memory device,
   wherein the instruction set is a set of control signals that are listed in an order of a control procedure of the nonvolatile memory device in order to control the nonvolatile memory device.

2. The data storage device according to claim 1, wherein the memory control unit comprises:
   a descriptor processing block suitable for extracting flail the descriptor parameter corresponding to the fetched instruction set from the descriptor and adding the extracted descriptor parameter to the fetched instruction set; and
   a signal generation block suitable for generating the control signals based on the instruction set and the descriptor parameter.

3. The data storage device according to claim 2, wherein the descriptor processing block comprises:
   a direct memory access (DMA) block suitable for reading the descriptor and data from the working memory;
   a descriptor fetch block suitable for controlling the DMA block to read the descriptor;
   an instruction fetch block suitable for fetching the instruction set based on the address of the instruction set included in the descriptor, extracting the descriptor parameter from the descriptor, and adding the extracted descriptor parameter to the fetched instruction set; and
   an instruction push block suitable for providing the fetched instruction set and the descriptor parameter that is added to the fetched instruction set to the signal generation block, and processing the read data to be provided to the nonvolatile memory device, or data read from the nonvolatile memory device.

4. The data storage device according to claim 3, wherein the descriptor fetch block comprises:
   a descriptor queue suitable for storing a descriptor ID corresponding to the descriptor; and
   a descriptor fetch part suitable for generating a descriptor address based on the descriptor ID, and providing the descriptor address to the DMA block.

5. The data storage device according to claim 4, wherein the DMA block reads the descriptor from the working memory based on the descriptor address, and provides the descriptor to the instruction fetch block.

6. The data storage device according to claim 4, wherein the control unit generates the descriptor and the descriptor ID, and
   wherein the descriptor fetch part fetches the descriptor ID in order of generation of the descriptor ID.

7. The data storage device according to claim 3, wherein the instruction fetch block comprises an instruction fetch part suitable for fetching the instruction set from the instruction memory, and extracting the descriptor parameter corresponding to the instruction set from the descriptor.

8. The data storage device according to claim 7, wherein the plurality of instruction sets are loaded in the instruction memory during a boot-up operation of the data storage device, and
   wherein the instruction fetch part fetches the instruction set based on the address of the instruction set, which is included in the descriptor.

9. The data storage device according to claim 3, wherein the instruction push block provides a data buffer memory address, which is included in the descriptor, to the DMA block, and
   wherein the DMA block provides the data corresponding to the data buffer memory address from the working memory to the signal generation block, or stores data, which is read from the nonvolatile memory device, in the working memory according to the data buffer memory address.

10. The data storage device according to claim 3, wherein the instruction push block provides the descriptor address included in the descriptor and a state information of the nonvolatile memory device to the DMA block, and
    wherein the DMA block stores the state information of the nonvolatile memory device in the control memory according to the descriptor address.

11. The data storage device according to claim 2, wherein, the instruction set includes one or more instructions arranged in order of a control procedure of the nonvolatile memory device.

12. The data storage device according to claim 1, wherein the descriptor includes: information about the descriptor;
    information about the data stored in the working memory and the control signals used for the memory control unit; and
    information about a command, an address, and data used for the nonvolatile memory device.

13. A memory control unit comprising:
a descriptor fetch block suitable for reading a descriptor, wherein the descriptor describes a work for controlling a nonvolatile memory device and includes an address of an instruction set stored in an instruction memory from a working memory;
an instruction fetch block suitable for fetching the instruction set from the instruction memory based on the address of the instruction set included in the descriptor, and adding a descriptor parameter extracted from the descriptor to the fetched instruction set; and
an instruction push block suitable for providing the fetched instruction set and the descriptor parameter that is added to the fetched instruction set to a signal generation block in order to generate control signals for the nonvolatile memory device based on the instruction set and the descriptor parameter,
wherein the instruction set is a set of control signals that are listed in an order of a control procedure of the nonvolatile memory device in order to control the nonvolatile memory device.

14. The memory control unit according to claim 13, further comprising:
a direct memory access (DMA) block suitable for reading the descriptor and data from the working memory.

15. The memory control unit according to claim 14, wherein the descriptor fetch block comprises:
a descriptor queue suitable for storing an ID of the descriptor; and
a descriptor fetch part suitable for generating a descriptor address based on the descriptor ID for the DMA block to read the descriptor based on the descriptor address.

16. The memory control unit according to claim 15, wherein the instruction fetch block comprises an instruction fetch part suitable for fetching the instruction set from the instruction memory based on the address of the instruction set, which is included in the descriptor.

17. The memory control unit according to claim 14, wherein the instruction push block provides a data buffer memory address, which is included in the descriptor, to the DMA block, and
wherein the DMA block provides the data corresponding to the data buffer memory address from the working memory to the signal generation block, or stores data, which is read from the nonvolatile memory device, in the working memory according to the data buffer memory address, and
wherein the instruction push block provides the descriptor address included in the descriptor and a state information of the nonvolatile memory device to the DMA block, and
wherein the DMA block stores the state information of the nonvolatile memory device in the working memory according to the descriptor address.

18. A memory control unit comprising:
a direct memory access (DMA) block suitable for reading descriptor and data from a working memory, wherein the descriptor describes a work for controlling a nonvolatile memory device and includes an address of an instruction set stored in an instruction memory;
a descriptor queue suitable for storing a descriptor ID corresponding to the descriptor;
a descriptor fetch part suitable for generating a descriptor address based on the descriptor ID for the DMA block to read the descriptor based on the descriptor address;
an instruction fetch part suitable for fetching the instruction set from the instruction memory based on the address of the instruction set included in the descriptor, and adding a descriptor parameter extracted from the descriptor to the fetched instruction set; and
an instruction push part suitable for providing the fetched instruction set and the descriptor parameter that is added to the fetched instruction set to a signal generation block, and requesting the DMA block to process data stored in the working memory or data to be stored in the working memory based on the address of the descriptor,
wherein the instruction set is a set of control signals that are listed in an order of a control procedure of the nonvolatile memory device in order to control the nonvolatile memory device.

19. The memory control unit according to claim 18, wherein the signal generation block provides a processing result, according to the descriptor, to the instruction push part.

20. The memory control unit according to claim 18, wherein the signal generation block generates control signals for controlling the nonvolatile memory device based on the instruction set and the descriptor parameter.

* * * * *